United States Patent
Tsai et al.

(10) Patent No.: US 11,536,811 B2
(45) Date of Patent: Dec. 27, 2022

(54) DISTANCE MEASURING DEVICE AND METHOD

(71) Applicant: National Chiao Tung University, Hsinchu (TW)

(72) Inventors: Chia-Ming Tsai, Hsinchu (TW); Yu-Wei Chen, Taichung (TW); Yung-Chien Liu, New Taipei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 496 days.

(21) Appl. No.: 16/705,575

(22) Filed: Dec. 6, 2019

(65) Prior Publication Data
US 2021/0173053 A1    Jun. 10, 2021

(51) Int. Cl.
*G01S 7/4865*    (2020.01)
*G01S 17/933*    (2020.01)
*G01S 17/32*    (2020.01)
*G01S 7/48*    (2006.01)

(52) U.S. Cl.
CPC .......... *G01S 7/4865* (2013.01); *G01S 7/4808* (2013.01); *G01S 17/32* (2013.01); *G01S 17/933* (2013.01)

(58) Field of Classification Search
CPC ....... G01S 7/4808; G01S 7/4865; G01S 17/32
See application file for complete search history.

(56) References Cited

U.S. PATENT DOCUMENTS

| 9,874,629 | B2 * | 1/2018 | Kostamovaara | G01C 3/08 |
| 2013/0175435 | A1 * | 7/2013 | Drader | G01S 7/4861 |
| | | | | 250/208.2 |
| 2021/0124027 | A1 * | 4/2021 | Holzhüter | G01S 17/931 |

* cited by examiner

*Primary Examiner* — Bryan Bui
(74) *Attorney, Agent, or Firm* — Li & Cai Intellectual Property (USA) Office

(57) ABSTRACT

A distance measuring device includes a pulsed laser source, a light receiving unit and a computing module. The pulsed laser source emits a laser pulse to a target in accordance with a predetermined period. The light receiving unit has a photon receiving type of light receiving element that receives incident light and outputs a binary pulse, and the binary pulse is used to indicate whether a photon receiving event occurs. The computing module is configured to receive the binary pulse and determine whether an inter-period coincidence event occurs, and the inter-period coincidence event is defined by detecting a plurality of photon receiving events exceeding a predetermined count, on relative positions in a predetermined period number of the predetermined periods. If the calculation module determines that the inter-period coincidence event occurs, a distance of the target is calculated according to time information related to the inter-period coincidence event.

18 Claims, 13 Drawing Sheets

DISTANCE MEASURING DEVICE AND METHOD

FIELD OF THE DISCLOSURE

The present disclosure relates to a distance measuring device and method, and more particular to a distance measuring device and method using an inter-period coincidence technique.

BACKGROUND OF THE DISCLOSURE

Autonomous cars have been a popular research topic in recent years, so that there has been a significant increase in the number of researches related to advanced driver assistance systems (ADAS) and light detection and ranging (LIDAR) correlated with the autonomous cars. Existing LIDAR mainly uses charge-coupled devices (CCDs) or avalanche photodiodes (APDs). Single-photon avalanche diodes (SPADs) stand out from the other sensors due to extreme high gain and its capability to output digital signals.

Since LIDAR has been studied, whether it is Direct Time of Flight (D-TOF) or Indirect Time of Flight (I-TOF), the suppression of ambient light has always been a major issue in the LIDAR studies. Since the amount of background light directly determines an accuracy of the measurement for LIDAR, if the detected background light is too strong, it is necessary to lengthen an integration time to obtain more events to increase a confidence level of the measurement to avoid false detection, or otherwise the power of the light source would need to be increased. However, the cost of lengthening the integration time is that each measurement time will become several times or even tens of times longer, which directly affects a detection rate.

On the other hand, increasing the laser power can cause eye safety problems, and is only suitable for experimental research or special aspects related to space. On the contrary, automobile optical radars are urgently in need of high optical frame rate and low laser power.

Furthermore, in applications relating to automotive optical radars and autonomous driving, background light suppression is important and even directly determines reliabilities of products. However, in the existing suppression technology, although the suppression effect can be achieved, the measurement rate can be sacrificed to a certain extent.

Therefore, improving the measurement mechanism to increase a noise signal ratio (SNR) without affecting the detection rate has become one of important issues in the art.

SUMMARY OF THE DISCLOSURE

In response to the above-referenced technical inadequacies, the present disclosure provides a distance measuring device and method using inter-period coincidence technique.

In one aspect, the present disclosure provides a distance measuring device including a pulsed laser source, a light receiving unit and a computing module. The pulsed laser source is configured to emit a laser pulse to a target in accordance with a predetermined period. The light receiving unit has a photon receiving type of light receiving element that receives incident light and outputs a binary pulse, and the binary pulse is used to indicate whether a photon receiving event occurs. The computing module is configured to receive the binary pulse and determine whether an inter-period coincidence event occurs, and the inter-period coincidence event is defined by detecting a plurality of photon receiving events exceeding a predetermined count, on relative positions in a predetermined period number of the predetermined periods. If the calculation module determines that the inter-period coincidence event occurs, a distance of the target is calculated according to time information related to the inter-period coincidence event.

In one aspect, the present disclosure provides a distance measuring method, including: configuring a pulsed laser source to emit a laser pulse to a target in accordance with a predetermined period; configuring a photon counting type of light receiving element of a light receiving unit to receive incident light and output binary pulses, wherein each of the binary pulses is used to indicate whether a photon receiving event occurs; configuring a computing module to receive the binary pulses and determine whether an inter-period coincidence event occurs, wherein the inter-period coincidence event is determined to occur when a plurality of photon receiving events on relative positions in a predetermined period number of the predetermined periods are detected to exceed a predetermined count; and wherein if the calculation module determines that the inter-period coincidence event occurs, configuring the computing module to calculate a distance of the target according to time information related to the inter-period coincidence event.

Therefore, the distance measuring device and method provided by the present disclosure can greatly improve a noise signal ratio (SNR) by detecting inter-period coincidence events without affecting the detection rate, such that LIDAR can be more competitive in the market.

In addition, compared with the existing background light suppression technology, the present disclosure improves on the large loss of signals caused by the existing architecture during operation, so that the measurement time is lengthened, and the amount of signals is increased by several times to an order of magnitude while maintaining the ability to suppress light noise, thereby satisfying and maintaining the greatest advantage of the single photon detector, that is, capabilities in weak light applications. Furthermore, in an aspect of hardware costs, the amount of time-to-digital converter (TDC) required can be reduced due to the greatly suppressed noise, thereby reducing the required area of the system.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
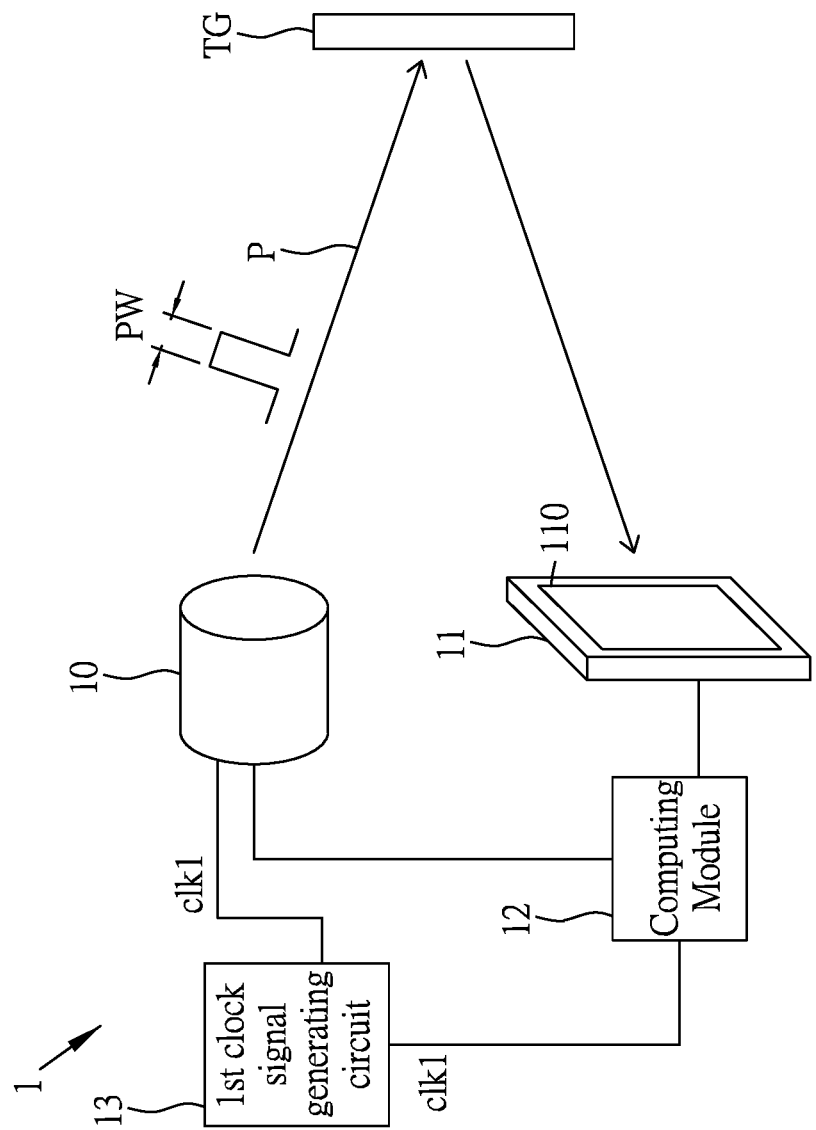
FIG. 1 is a block diagram of a distance measuring device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

LIDAR is very susceptible to background light (especially for sunlight) in outdoor environments, and car LIDAR is even more difficult to avoid the issue. Therefore, the present disclosure provides a circuit architecture that can effectively suppress background light, called an inter-period coincidence technique.

Reference is made to FIG. 1, which is a block diagram of a distance measuring device according to an embodiment of the present disclosure. The embodiment of the present disclosure provides a distance measuring device 1 including a pulsed laser source 10, a light receiving unit 11 and a computing module 12. The pulsed laser source 10 is configured to emit a laser pulse P to a target, and the laser pulse P has a predetermined period. The distance measuring device 1 further includes a first clock generating circuit 13 connected to the pulsed laser source 10 and the computing module 12 and configured to generate a first clock signal clk1, in which the pulsed laser source 10 obtains the predetermined period through the first clock signal Clk1.

The light receiving unit 11 has a photon receiving type of light receiving element 110, which receives incident light and outputs a binary pulse. In detail, the light receiving element 110 may be a single-photon avalanche diodes (SPADs) chip, and the SPAD element has advantages of high internal gain, low noise, and high time resolution. Since an output of the SPADs chip is a digital signal, an integration design process that is now quite mature can be applied to signal processing. SPADs operate mainly on the breakdown voltage of a diode, where an ionization rate reaches a peak with a gain of several million, and this kind of operation is also called Geiger-mode. When the photon enters the material and is absorbed to generate carriers, a large current is generated, and since the gain is extremely high, photons can be detected with a single photon level, and thus SPAD is referred to as a single photon detector.

The binary pulse outputted by the light receiving element 110 is used to indicate whether a photon receiving event occurs. The light receiving element 110, serving as an SPAD in the Geiger mode, theoretically has an infinite gain, the amplified current value does not contain information, and is output as a binary message (voltage pulse) according to presence or absence of avalanche when the photon is incident.

As described above, the light receiving unit 11 in the present embodiment outputs binary information (voltage pulse) for indicating whether a photon incident event occurs. Therefore, duration of a pulse width of the voltage pulse is not affected by variations in the internal amplification gain or the like, and stable photon detection can be achieved independent of the temperature.

The computing module is configured to receive the binary pulse and determine whether an inter-period coincidence event occurs. In detail, a predetermined period number and a predetermined count can be preset, and an occurrence of the inter-period coincidence event indicates that a plurality of photon receiving events are detected to exceed a predetermined count, on relative positions in a predetermined period number of the predetermined periods. In other words, assuming that the predetermined period number is N and the predetermined count is M, the basis for determining whether the inter-period coincidence event occurs is that N consecutive periods are considered, and if the events are detected on relative positions in M periods (assuming 0) within a coincidence duration, signals can be output to an output stage circuit. This case is defined as MPNC.

If the calculation module 12 determines that the inter-period coincidence event occurs, a distance of the target is calculated according to time information related to the inter-period coincidence event.

Before explaining advantages of inter-period coincidence technology, an aspect of coincidence events that occur in a single period without inter-period should firstly be considered, and the aspect is defined as 1PMC herein. For example, after a first photon is detected, the SPAD sensor needs to detect (M−1) photon signal within a next overlap duration 0, and the signal can be output.

Hereinafter, reference is made to "Coincidence in SPAD-based time-of-flight sensors," 2017 13th Conference on Ph.D. Research in Microelectronics and Electronics (PRIME), Giardini Naxos, 2017, pp. 381-384, published by M. Beer, O M Schrey, B J Hosticka and R. Kokozinski in 2017.

Since distributions of laser light and ambient light can be regarded as a Poisson process, probability distributions of time differences between photon events can be approximated as Poisson distribution. A case of k-order coincidence is further considered. Firstly, a condition for the coincidence is defined as the coincidence being triggered only if more than m photon detection events occur in a period of time, which is called a k-order coincidence. Since the coincidence takes the detection of the first photon as a start time, thus k=m−1, and the probability of occurrence of coincidence can be obtained by correlation calculations. After the probability density function Pk,N(t) is obtained, the probability 11 of occurrence of the coincidence event can be obtained by integrating the function, where θ is the coincidence time, meaning that there are m events occurring within the coincidence time θ, that is, the coincidence is triggered.

Then, according to the derivation of the papers, the probability of coincidence can be approximated as the following equation (1):

$$\Lambda = \frac{(N\lambda)^m \cdot \vartheta^{m-1} \cdot m}{(1 + N\lambda\vartheta) \cdot (m-1)!(N\lambda\vartheta)^m}; \qquad (1)$$

Where Nλ represents the light intensity, m corresponds to the M of the previous mentioned 1PMC, which represents a threshold for filtering by coincidence, and θ represents the coincidence time. In addition, the return probability can be defined as the following equation (2):

$$\text{Preturn} = N\lambda/(1/2\,\vartheta\,) = 2N\lambda\vartheta \qquad (2);$$

In this way, a relationship between the coincidence probability and the return probability can be obtained and plotted.

Figure 2:
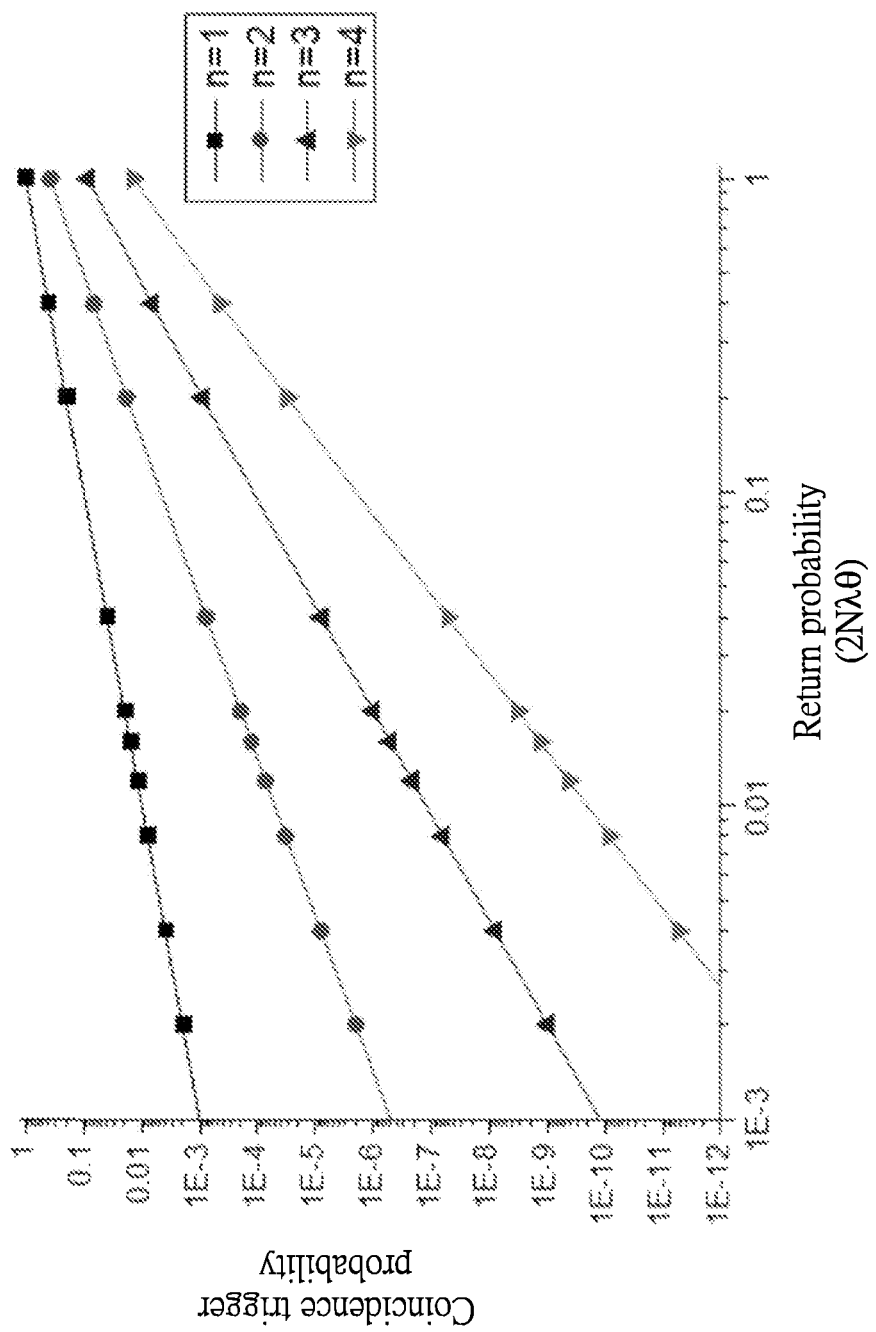
FIG. 2 is a diagram showing a relationship between trigger probabilities and light intensities of the non-inter-period coincidence technique according to an embodiment of the present disclosure.

FIG. 2 is a diagram showing a relationship between trigger probabilities and light intensities of the non-inter-period coincidence technique according to an embodiment of the present disclosure. The horizontal axis is the probability that the SPAD detects the return of the photon, and the vertical axis is the theoretically predicted probability that the return photons capable of remaining after the coincidence to enter the time-to-digital converter. In FIG. 2, m=1 represents an original SPAD signal, that is, the result without coincidence, m=2, m=3 and m=4 represent that the coincidence will be triggered only if more than m events are detected within a coincidence time θ, and m=2, m=3 and m=4 correspond to 1P2C, 1P3C, and 1P4C, respectively. As can be seen from FIG. 2, the slopes after the coincidence in the graph significantly increase while comparing with the slopes with non-coincidence (1P1C, 1P2C, and the like). Since counts generated by the laser are concentrated in several bins and counts generated by the background light are evenly distributed in each bin, therefore, the counts generated by the laser will fall on the right side of the graph, and the counts generated by the background light will fall on the left side of the graph. Furthermore, after the coincidence, although the counts generated by the laser drop, the counts generated by the background light will drop even more, and therefore the overall SNR will significantly increase, thereby increasing the accuracy. As m increases, the suppression of the background light and the increase of SNR will be more obvious.

The relevant derivation of non-inter-period coincidence has been described above. Although the result can suppress the background light and effectively increase the SNR, it is undeniable that the loss on the signal is also very significant, and the decrease of the signal cannot be ignored in weak light situation. Further, the amount of loss on the signal directly affects the minimum integration time required for each measurement and affects the speed of scanning.

Figure 3:
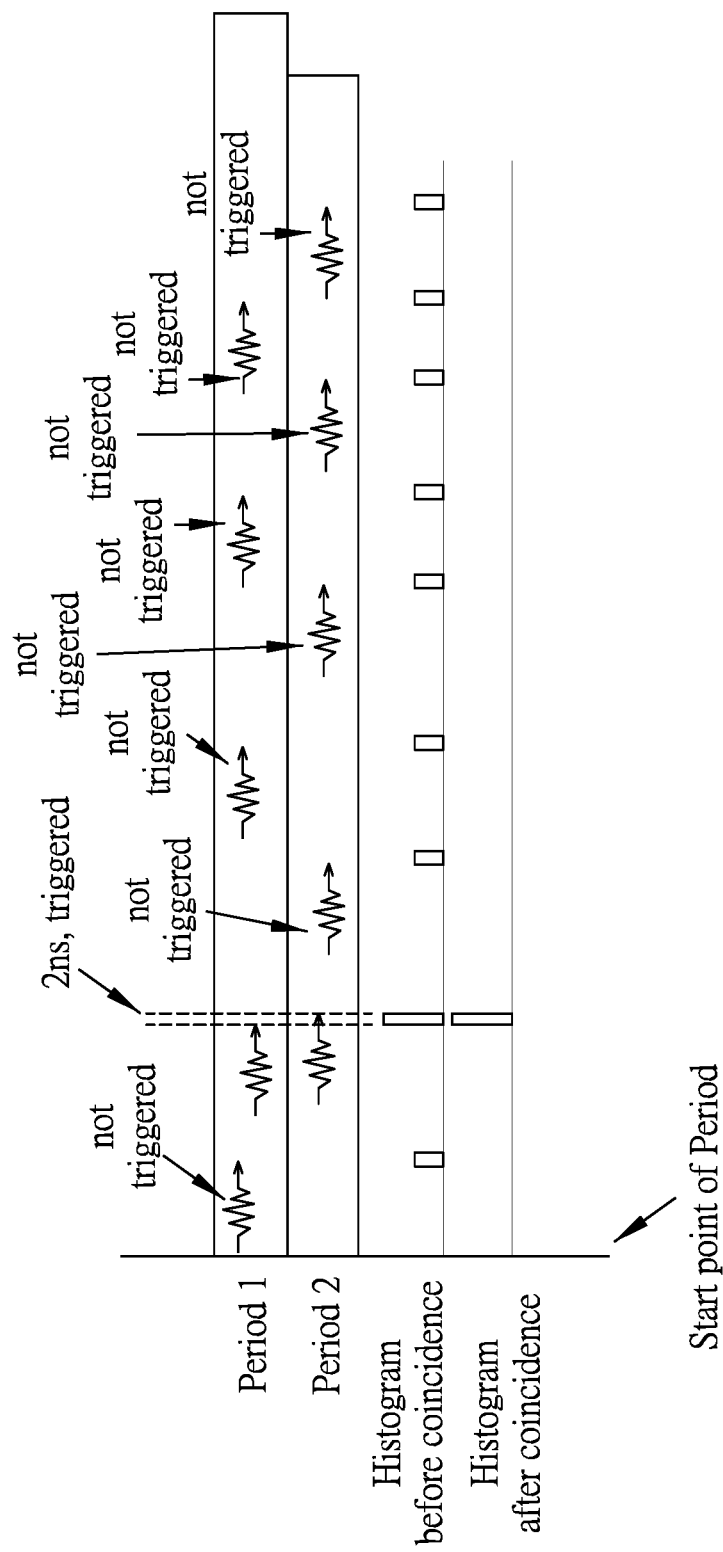
FIG. 3 is a schematic diagram of 2P2C coincidence according to an embodiment of the present disclosure.

To this end, the present disclosure utilizes an inter-period coincidence technique. Before extending the model to the NPMC, the simplest configuration 2P2C is first described. The trigger condition of 2P2C is that photon avalanche events are detected by the SPAD in two consecutive periods, and the time difference of the events detected in the two periods ranges within a very short time θ (2 ns here). Reference is made to FIG. 3, which is a schematic diagram of 2P2C coincidence according to an embodiment of the present disclosure. Since the background light enters the component in a random distribution in time, most of the events in FIG. 3 are filtered by the trigger condition of the coincidence, and thus the coincidence is not triggered in the results. Conversely, since the return time of the laser photon is periodic, the probability of the coincidence is relatively increased. In this case, all of durations of the events are provided relative to a start point of the period, and the periods shown may be constant periods, constant changing periods, random periods, and thus the end times of the periods may be different.

When discussing a coincidence trigger probability, the return probability Preturn mentioned above should be considered, and the return probability of the background light is related to the coincidence time θ, which is an average return number of the background light per second multiplied by a ratio of the coincidence time θ to the frequency of the pulse laser, as shown in equation (10):

Preturn=average count background light within coincidence time θ/laser frequency    (10);

After the return probability (P) is obtained, the probability that the events are simultaneously detected in two periods in a range before and after a relative time is obtained, as shown in equation (11):

$$\Lambda_{2P2C} = P^2 \qquad (11);$$

Figure 4:
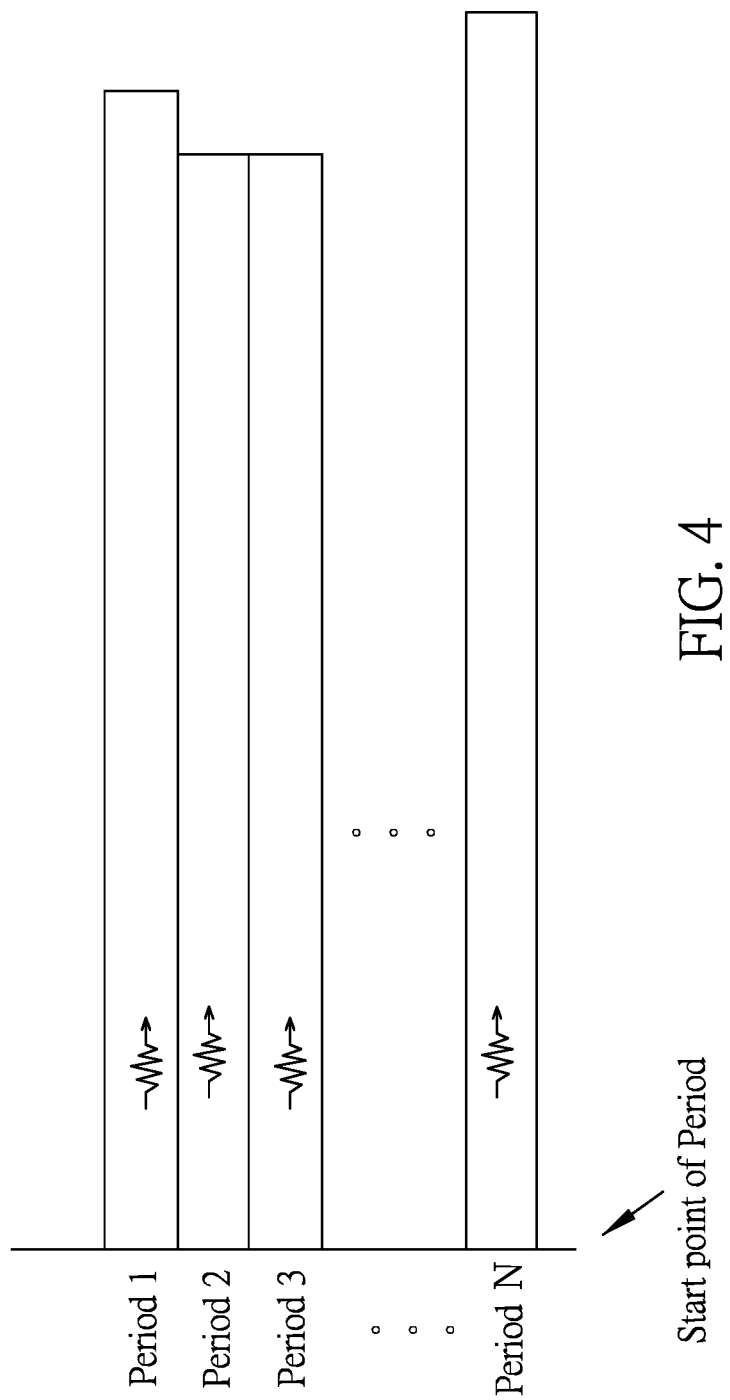
FIG. 4 is a schematic diagram of NPNC coincidence according to an embodiment of the present disclosure.

Similarly, considering the case of NPNC, that is, the coincidence will be triggered only if the events are detected to occur at corresponding timings in the consecutive N period, and the return-probability that photon event are detected in each periods are P, as shown in FIG. 4, which is a schematic diagram of NPNC coincidence according to an embodiment of the present disclosure. Therefore, it can be proved that in the case of NPNC, similar results can be obtained, as shown in equation (12):

$$\Lambda_{NPNC} = P^N \qquad (12);$$

Similarly, in FIG. 4, all of durations of the events are provided relative to a start point of the period, and the periods shown may be constant periods, constant changing periods, random periods, and thus the end times of the periods may be different.

Figure 5:
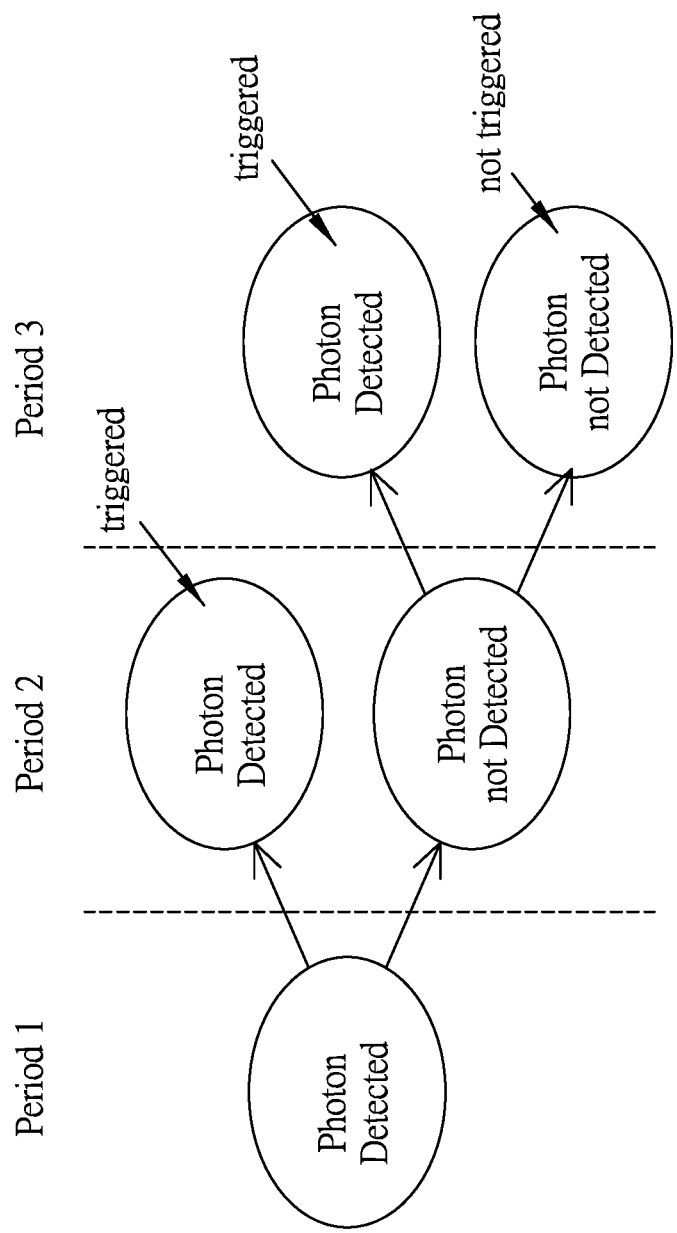
FIG. 5 is a trigger path of 3P2C coincidence according to an embodiment of the present disclosure.

A case where the number of periods differs from the order of coincidence will be further explained below. For the 3P2C configuration, that is, photon events are required to be detected in two of three periods during the coincidence time. Reference is made to FIG. 5, which is a trigger path of 3P2C coincidence according to an embodiment of the present disclosure. In a first period, the SPAD has probability P to detect the photon. If the photon is detected, paths afterward are entered. In the second period, the SPAD has the same probability P to detect the photon, thus the path on the upper side of FIG. 5 has the probability P to be entered, and the path on the lower side of FIG. 5 has the probability (1−P) to be entered. At this time, a case where the photons are detected in the first and second periods has met the condition of the coincidence. The coincidence is triggered regardless of whether there is a photon event in the subsequent period, so that the path ends here. In the case where there isn't any event occurring in the second period, the third period is entered. A condition of the third period is the same as the second period. Therefore, the path that the event is detected will trigger the coincidence. However, since 3P2C only considers 3 periods, the path where the photon is not detected ends here, and it is determined that the coincidence is not triggered. The coincidence probability passes the 3P2C configuration is shown in equation (13):

$$\Lambda_{3P2C} = (P + (1-P)P) = P^2 + (P^2 - P^3) = 2P^2 - P^3 \qquad (12)$$

3P2C has an additional term (P2−P3) while comparing with 2P2C, that is, a count value of 3P2C will be more than that of 2P2C under the same input signal. Therefore, when the return probability of the system is not high enough, that is, in the weak light situation, the loss of the signal counts in the coincidence will be quite large. Therefore, the signal counts can be increased by increasing the predetermined period number to avoid an extension of the integration time.

Therefore, a case of NPMC inter-period coincidence can be further considered, and the trigger probability is as shown in equation (13):

$$\Lambda_{NPMC} = \Sigma_{S=M}^{N-1} C_{M-2}^{S-1} \cdot P^M (1-P)^{S-M+1} \qquad (13)$$

Figure 6:
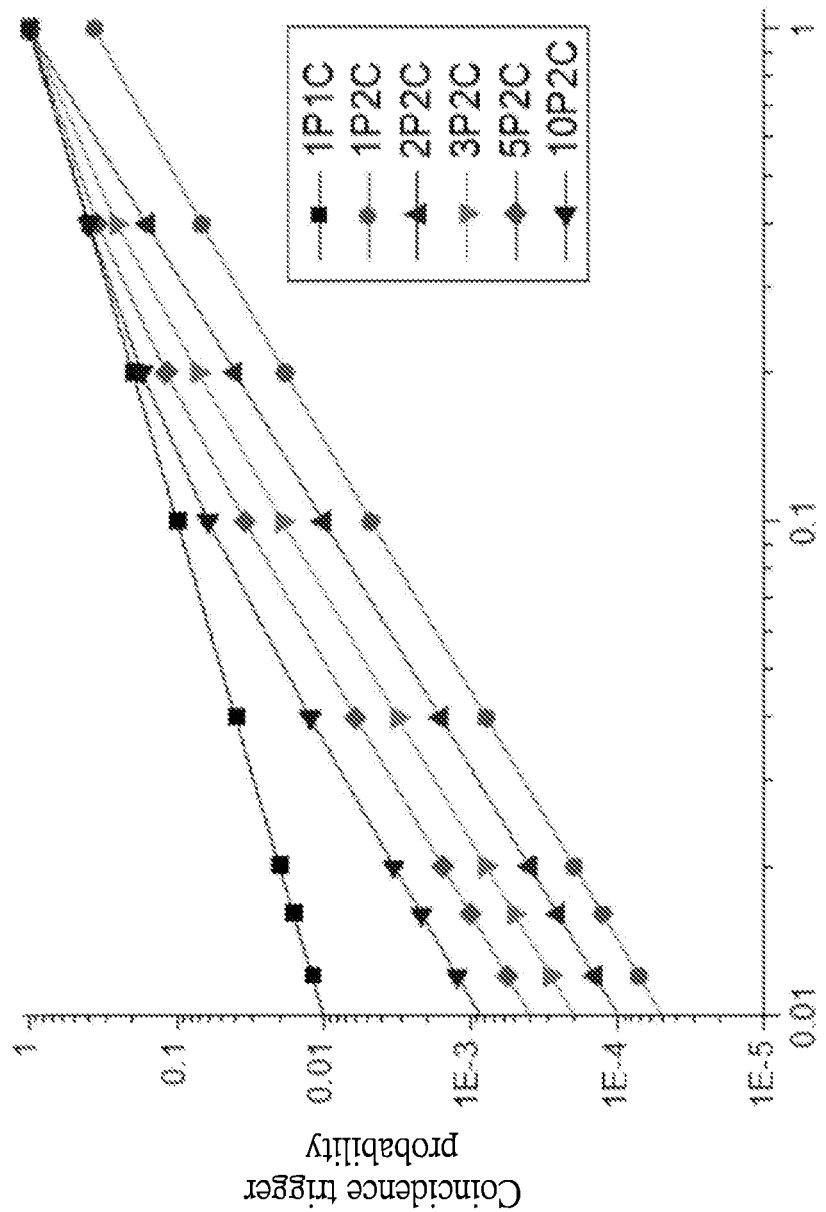
FIG. 6 is a graph showing multiple configuration trigger probabilities of the inter-period technique according to an embodiment of the present disclosure.

Reference is made to FIG. 6, which is a graph showing multiple configuration trigger probabilities of the inter-period technique according to an embodiment of the present disclosure. As shown in FIG. 6, 1P2C in FIG. 6 is the same as n=2 in FIG. 2, which is used for comparison with the inter-period coincidence configurations 2P2C, 3P2C, 5P2C and 1OP2C. Compared with 1P2C, the count values of inter-period coincidence have significantly increased. For example, the count value of 2P2C has increased by about 2 times, the count value of 3P2C has increased by about 4 times, and the increase of count value represents the decrease of integration time. SNRs can also be focused in FIG. 6, in which the slope of the curve represents capabilities of the configuration to suppress the background light. It can be found that regardless of whether it is 2P2C, 3P2C, 5P2C, 1OP2C, the curves thereof are close to parallel to 1P2C, this represents that the inter-period technique can increase the count value without affecting the SNR to shorten the minimum integration time required for each measurement. The feature is one of the advantages of the inter-period coincidence technique. In addition, the inter-period coincidence technique can also increase the SNR by adjusting the predetermined period number and the predetermined count, so as to increase the suppression to the background light.

Figure 7:
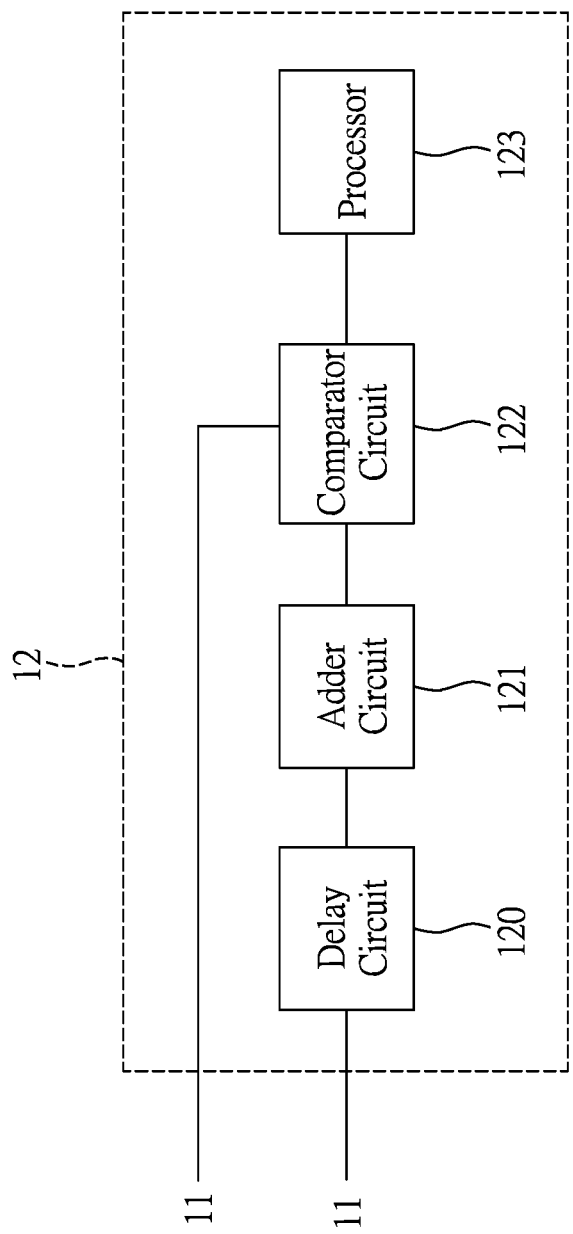
FIG. 7 is a block diagram of a computing module in accordance with an embodiment of the present disclosure.
Figure 8:
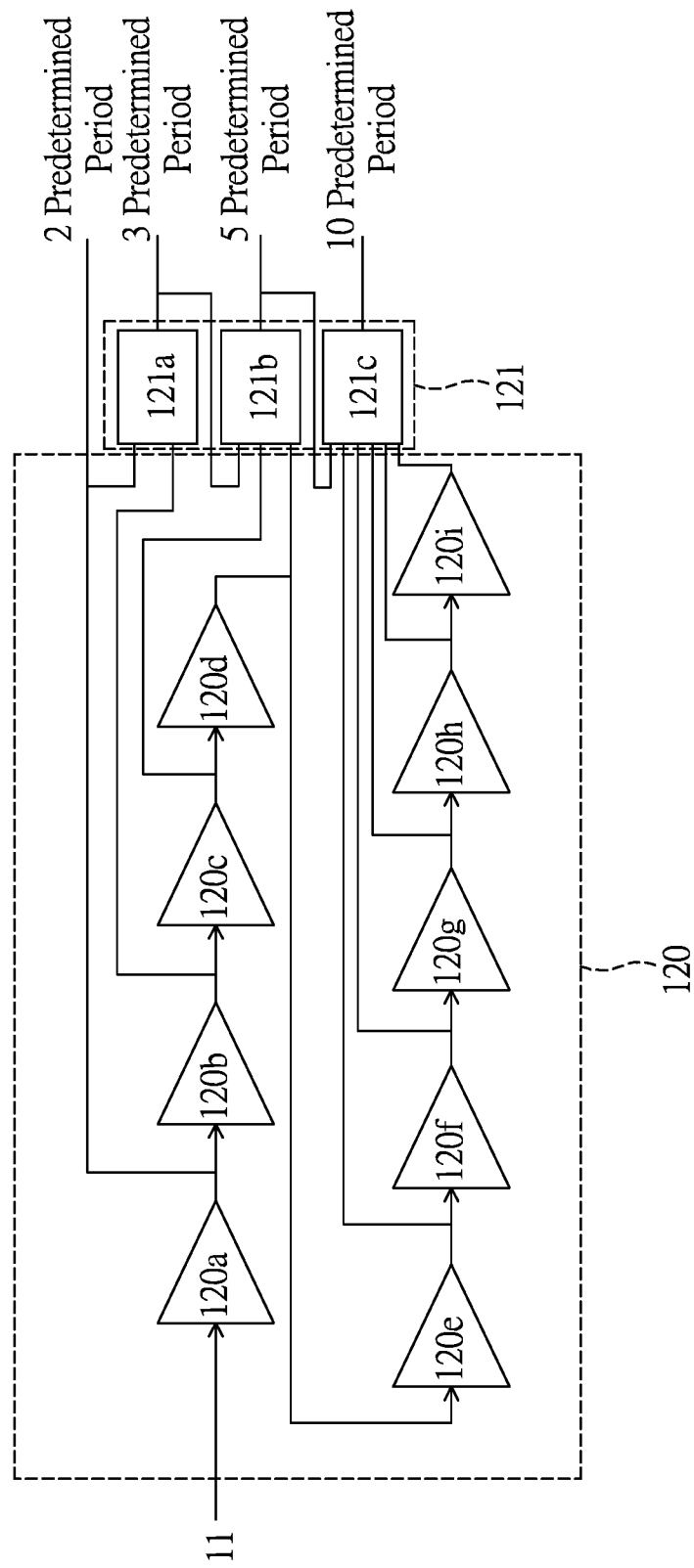
FIG. 8 is a block diagram showing a combination of a delay circuit and an adder circuit according to an embodiment of the present disclosure.

In order to achieve the above mechanism in a hardware stage, reference can be further made to FIG. 7 and FIG. 8, which are respectively a block diagram of a computing module and a block diagram showing a combination of a delay circuit and an adder circuit according to an embodiment of the present disclosure. As shown in FIG. 7, the computing module 12 includes a delay circuit 120, an adder circuit 121, a comparator circuit 122, and a processor 123. The delay circuit 120 includes a plurality of delay elements 120a, 120b, . . . , 120i configured to receive binary pulses, the delay elements 120a, 120b, . . . , 120i respectively delaying the binary pulses by the predetermined period to respectively generate a delay period number of delay signals. Here, the delay circuit 120 delays the binary pulses by the predetermined period through the first clock signal clk1. The adder circuit 121 includes a plurality of adders 121a, 121b, and 121c. At least one of the delay signals is selected to be accumulated according to a period counting configuration, for example, 2P2C, 3P2C, 5P2C, and 1OP2C, to generate an accumulated trigger signal.

It should be noted that the period counting configuration defines a predetermined period number of a plurality of the predetermined periods, and the accumulated trigger signal records data of the binary pulse in the predetermined period number of the predetermined periods in different time intervals.

In detail, as shown in FIG. 8, the inter-period coincidence configurations to be performed include 2P2C, 3P2C, 5P2C, and 1OP2C, the required delay line is 9 groups for conveniently comparing with FIG. 6. Each group of delay elements 120a, 120b, . . . , 120i is delayed by one period, that is, a predetermined period of the laser pulse P in FIG. 1. All the required delay signals are accumulated by the adders 121a, 121b, and 121c, respectively, and the obtained signal is the sum of all events of the N−1 periods except the first period, and the obtained signal is sent to the next stage for performing other operations.

Further, the comparator circuit 122 receives one of the delay signals and a threshold setting signal to determine whether a number of the binary pulses larger than a predetermined count of the binary pulses during the predetermined period number of the predetermined periods to determine whether the inter-period coincidence event occurs, and generates a determination result signal. In this case, the threshold setting signal is related to the predetermined count.

As previously described, the output of adder circuit 121 includes the accumulation of N−1 periods except the first period, since a photon event must be detected in the first period according to the coincidence trigger condition.

Figure 9:
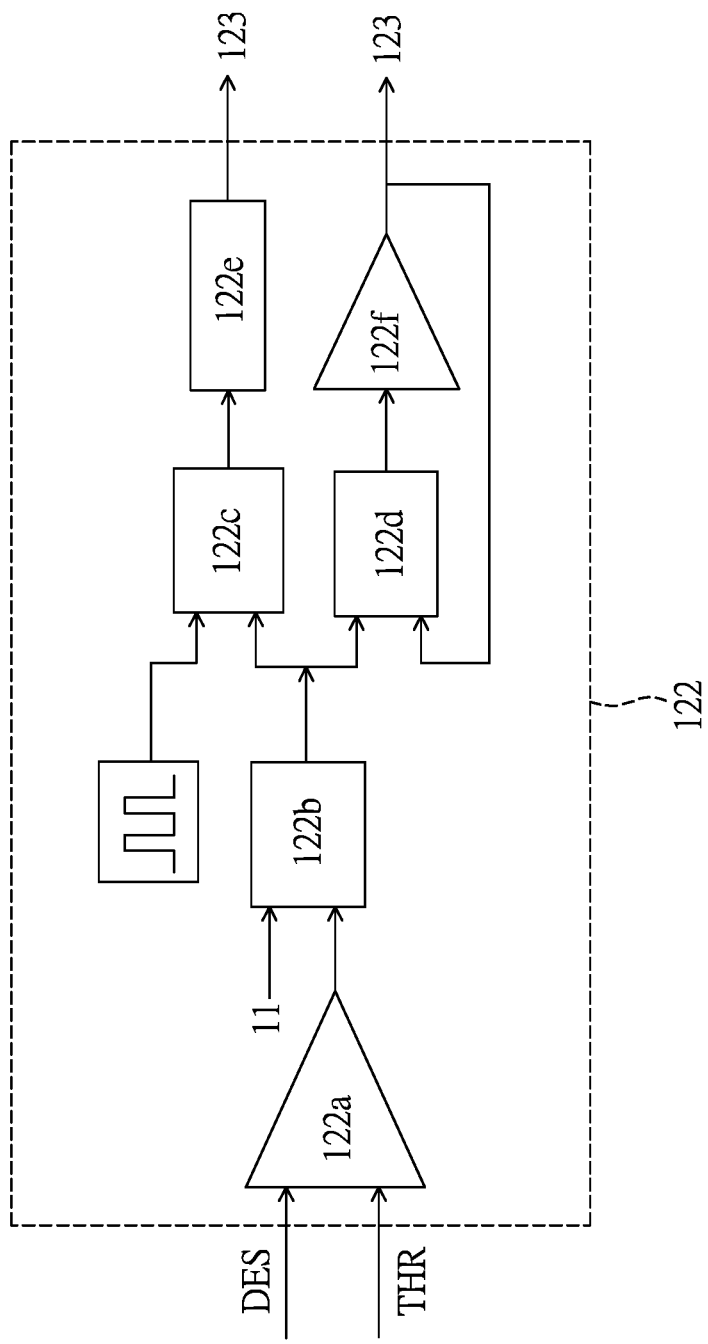
FIG. 9 is a block diagram of a comparator circuit according to an embodiment of the present disclosure.

Reference is made to FIG. 9, which is a block diagram of a comparator circuit according to an embodiment of the present disclosure. As shown, the comparator circuit 122 includes a comparator 122a, a multiplier 122b, a multiplier 122c, an adder 122d, a counter 122e, and a delay element 122f. Since the selected configuration trigger conditions in this case are two photons, after the first period is excluded, the counts of remaining periods need to be more than one. Therefore, a delay signal DES delayed by N periods is input to a first input of the comparator 122a, a threshold setting signal THR setting a threshold to 0.5 is input to the second input of the comparator 122a. An output of the comparator 122a is a signal composed of 0 and 1, and AND operation is performed on the signal and an original SPAD signal from the photo detecting unit 11 to obtain the NP2C inter-period coincidence signal. An accumulation of the total number and the histogram by the multiplier 122b, the multiplier 122c, the adder 122d, the counter 122e, and the delay element 122f is then performed on the NP2C inter-period coincidence signal.

In addition, the predetermined period may include a plurality of variable periods in addition to the constant period, and the delay elements 120a, 120b, . . . , 120i respectively delay the binary pulses by the plurality of variable periods to generate the delay period number of the delay signals. In other words, based on the above architectures, the model can be further developed. If the delay time of the delay line formed by the delay elements 120a, 120b, . . . , 120i is set to be constant, it is a constant period inter-period coincidence mechanism. However, if the period is changed once in a while, an inter-period coincidence mechanism with variable period can be achieved. Therefore, if the variable period changes with a specific or random rule, an inter-period coincidence mechanism with a specific or random rule can be achieved.

Figure 10:
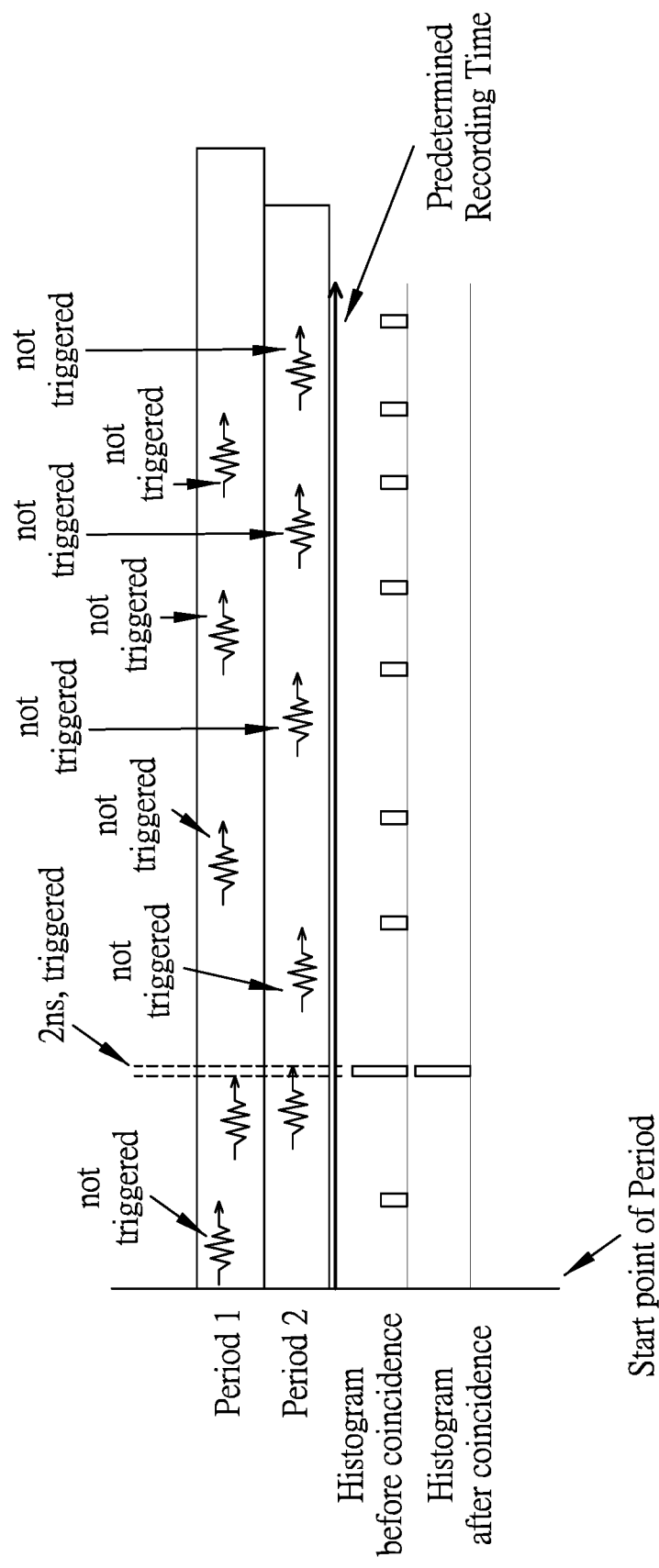
FIG. 10 is another schematic diagram showing 2P2C coincidence according to an embodiment of the present disclosure.

Reference is made to FIG. 10, which is another schematic diagram showing 2P2C coincidence according to an embodiment of the present disclosure. In the present embodiment, when the pulsed laser source 10 emits a laser pulse P to the target in a variable or random period, the photon incident event within a predetermined time after a start point of the random period can be recorded, as shown in FIG. 10.

For example, in the aforementioned embodiment with constant period, if 1 MHz laser is used as the pulsed laser source 10, the predetermined period is 1000 ns. In the embodiment, when the random period is used, if the shortest interval between the periods is 1000 ns, most of the periods are randomly between 1000 and 1500 ns. In this case, the photon incident event is recorded within a predetermined recording time after the start point of the period, for example, 1000 ns, and after a start point of the next period, the photon incident event is recorded within the same predetermined recording time 1000 ns, so as to determine whether an inter-period coincidence event occurs.

Next, the information of the previous period is replaced by the information of the current period, and awaits the signal of the next period, so that the inter-period coincidence technique with the random period can be realized. In addition, the relationship between the return probability of the constant period and the coincidence probability is also fully applicable when the variable period is utilized.

On the other hand, the adder circuit 122 can be further provided with the designed period counting configuration according to the specific or random rule described above, and accordingly select one of the delay signals to perform accumulation to generate the accumulated trigger signal. In this case, the period counting configuration defines a predetermined period number of variable predetermined periods.

Referring to FIG. 9, when the counter 122e is used for calculation, since the operation of the counter 122e is triggered by rising edges of the input signal, the counter 122e may not be able to detect two or more signals that are input consecutively. Therefore, it is necessary to change the pulse width of the signal to half of the original. For example, the method implemented here is to perform an AND operation on the pulse with the pulse width of half of the original and the signal of the NP2C. In addition, the accumulation of the histogram is obtained by delaying the signal by one period through the delay element 122f and adding the original signal by the output signal feedback thereto, such that the output resulted can be observed as an accumulation from the first period to the current period. Based on the accumulated results, the laser signal can be clearly identified on the time axis.

Next, the above result is input to the processor 123 as a determination result signal, and the processor 123 executes a ranging algorithm to calculate the distance of the target according to the determination result signal. For example, the direct time of flight (D-TOF) can be used for calculation. When the laser pulse source 10 emits the laser pulse, a signal as a start signal is transmitted to the processor 123, which may include, for example, a time digital converter (TDC). After the photon is reflected by the target TG to be detected by the light sensing unit 11, the aforementioned determination result signal is used as a stop signal, and the processor 123 is configured to calculate a time difference $\Delta\tau$ of the two signals, and obtain the distance of the target TG by multiplying the time difference $\Delta\tau$ by the speed of light c and dividing by 2.

Figure 11:
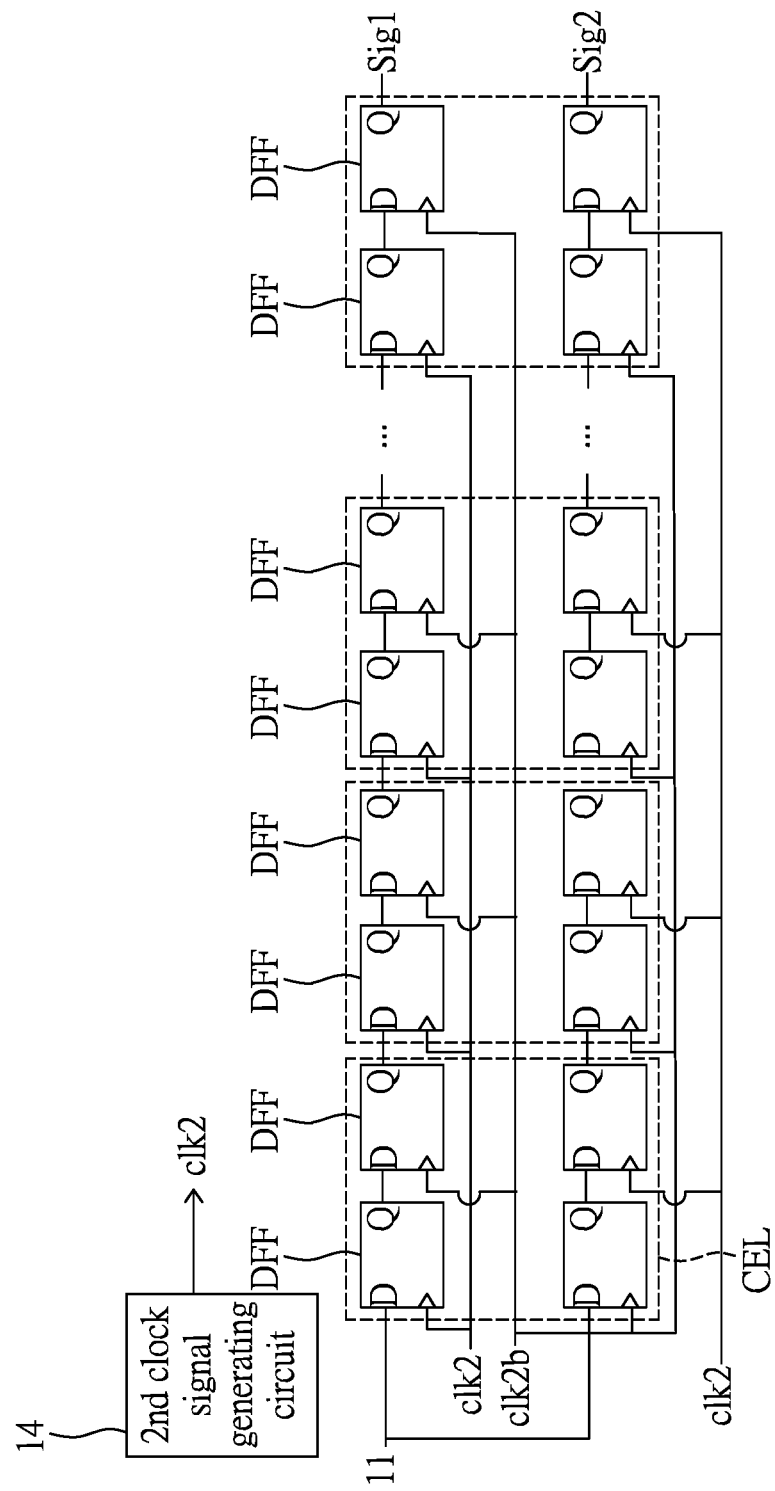
FIG. 11 is a delay line architecture according to an embodiment of the present disclosure.

A delay line architecture of the present embodiment will be described below with reference to FIG. 11. FIG. 11 is a delay line architecture according to an embodiment of the present disclosure. Two frequencies of the system will be defined first, one of which is a frequency of the laser pulse source 10, that is, the frequency of the first clock signal clk1 generated by the first clock generating circuit 13, and the frequency used herein may be, for example, 5 MHz. In addition, the distance measuring device 1 further includes a second clock generation circuit 14 for generating a second clock signal clk2 having a sampling period, the sampling period being related to a pulse width PW of the laser pulse P, and the period of the second clock signal clk2 being smaller than the period of the first clock signal clk1. In detail, in order to ensure that the data signal can be detected, the pulse width of this signal needs to be smaller than the pulse width PW of the SPAD signal. These two frequencies will determine the number of delay elements 120a, 120b, . . . , 120i required by the system, and the delay elements 120a, 120b, . . . , 120i may for example be D-type flip-flops DFF. The D-type flip-flops DFF receive the second clock signal clk2, and sample the binary pulse P according to the sampling period and delay to generate the delay signals.

In order to complete delay functions of the full D-type flip-flop delay line, the architecture needs to be set in 2 paths to ensure that each incoming signal can be delayed. As shown in FIG. 10, the delay circuit 120 includes a plurality of delay line units CEL. Four of the D-type flip-flops DFF of the plurality of D-type flip-flops DFF that are adjacent to each other are used as one delay line unit CEL.

As shown in FIG. 10, clock terminals of two of the adjacent four D-type flip-flops DFF receive the second clock signal clk2 and generate first half-delay signals sig1, and the clock terminals of the other two of the four adjacent D-type flip-flops DFF receive an inverted signal clk2b of the second clock signal clk2 and generate second half-delay signals sig2. Each path is responsible for detecting half of the signals, and each two of the signals in FIG. 10 are delayed by the second clock signal clk2 and the inverted signal clk2b by a period of the second clock signal clk2, so that each four D-type flip-flops DFF in the two paths can be regarded as one delay line unit CEL, and the number of delay line units CEL included in each delay line is a ratio of the frequency of the second clock signal clk2 received by the D-type flip-flops DFF and the frequency of the laser pulse. The adder circuit correspondingly selects the first half delay signal sig1 and the second half delay signal sig2 according to the period counting configuration, such as NPMC, to generate the accumulated trigger signal.

Figure 12:
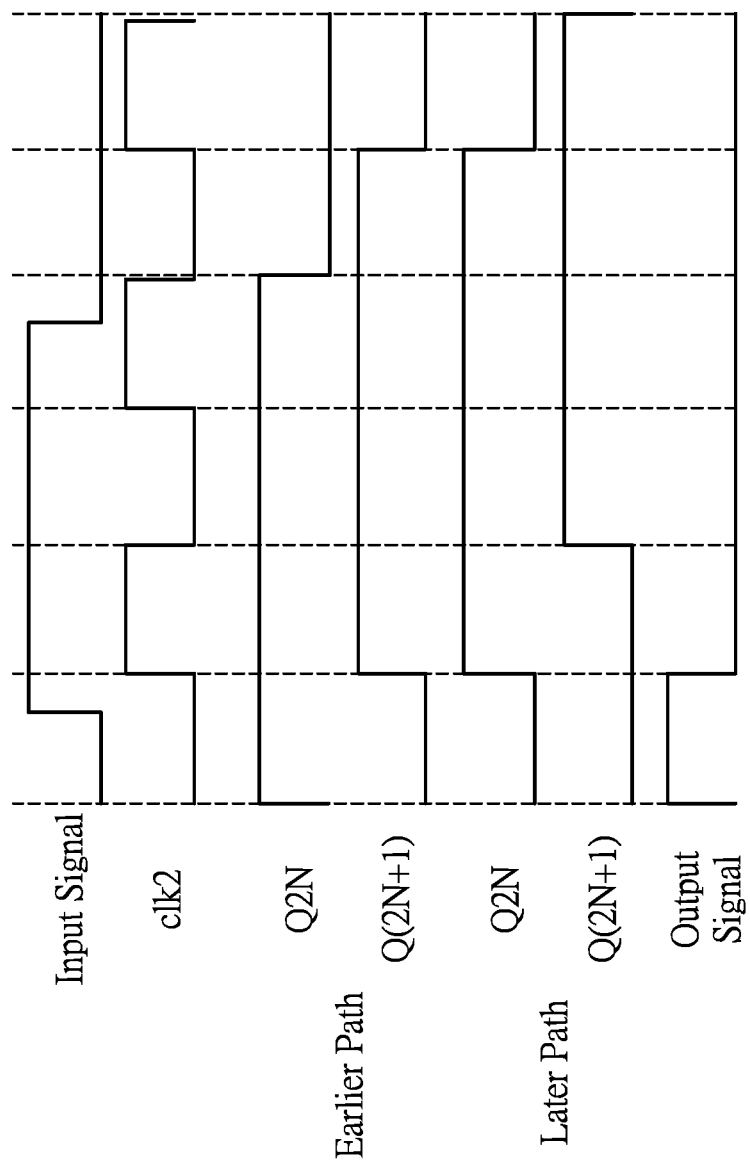
FIG. 12 is a timing diagram of signals of the delay line according to an embodiment of the present disclosure.

In addition, when the signal of the delay circuit is output, a size of the signal output window must be taken into consideration with the pulse width PW of the pulse signal. The pulse width PW causes a width of the signal output window to vary, and when the pulse width PW is wide, both paths detect signals simultaneously. After the pulse width PW is larger than half of the period of the second clock signal clk2, both paths detect the signals, one path being the earlier signal, and the other being the later signal. Moreover, both paths generate a signal output window, and the two signal output windows will be adjacent, as shown in FIG. 12, which is a timing diagram of signals of the delay line according to an embodiment of the present disclosure. In order to solve the issue, the earlier path must be selected as the output signal. An algorithm used in this embodiment is as shown in equation (14), a feature thereof being that the need for the determination of the earlier path by directly performing an OR operation on signals Q2N of the two paths, and on the signals Q(2N+1).

$$\text{output} = \frac{(Q2N_{path1} + Q2N_{path2})}{(Q(2N+1)_{path1} + Q(2N+1)_{path2})} \quad (14).$$

Figure 13:
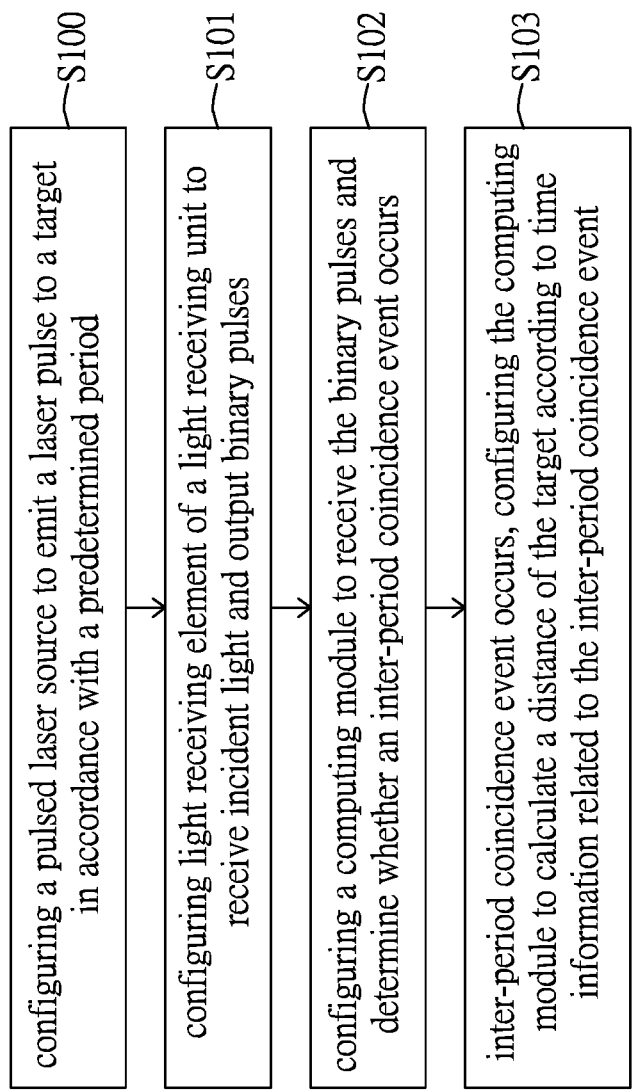
FIG. 13 is a flowchart of a distance measuring method according to another embodiment of the present disclosure.

Reference is made to FIG. 13, which is a flowchart of a distance measuring method according to another embodiment of the present disclosure. In detail, in the inter-period coincidence operation, in addition to the hardware architecture mentioned in the above embodiment, it can also be implemented by software.

Specifically, the time information of the SPAD signal can be recorded and calculated by software to achieve the event detection for the inter-period coincidence.

As shown in FIG. 13, the distance measuring method provided by the embodiment of the present disclosure includes the following steps:

Step S100: configuring a pulsed laser source to emit a laser pulse to a target in accordance with a predetermined period.

Step S102: configuring a photon counting type of light receiving element of a light receiving unit to receive incident light and output binary pulses, in which each of the binary pulses is used to indicate whether a photon receiving event occurs.

Step S103: configuring a computing module to receive the binary pulses and determine whether an inter-period coincidence event occurs. The inter-period coincidence event is determined to occur when a plurality of photon receiving events on relative positions in a predetermined period number of the predetermined periods are detected to exceed a predetermined count.

If the calculation module determines that the inter-period coincidence event occurs, the method proceeds to step S103: configuring the computing module to calculate a distance of the target according to time information related to the inter-period coincidence event.

Advantageous Effects of Embodiments

In conclusion, the distance measuring device and method provided by the present disclosure can greatly improve a noise signal ratio (SNR) by detecting inter-period coincidence events without affecting the detection rate, such that LIDAR can be more competitive in the market.

In addition, compared with the existing background light suppression technology, the present disclosure improves on the large loss of signals caused by the existing architecture during operation, so that the measurement time is lengthened, and the amount of signals is increased by several times to an order of magnitude while maintaining the ability to suppress light noise, thereby satisfying and maintaining the greatest advantage of the single photon detector, that is, capabilities in weak light applications. Furthermore, in an aspect of hardware costs, the amount of time-to-digital converter (TDC) required can be reduced due to the greatly suppressed noise, thereby reducing the required area of the system.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A distance measuring device, comprising:
    a pulsed laser source configured to emit a laser pulse to a target in accordance with a predetermined period;
    a light receiving unit having a photon counting type of light receiving element configured to receive incident light and output binary pulses, wherein each of the binary pulses is used to indicate whether a photon receiving event occurs; and
    a computing module configured to receive the binary pulses and determine whether an inter-period coincidence event occurs, wherein the inter-period coincidence event is determined to occur when a number of a plurality of photon receiving events on relative positions in a predetermined period number of the predetermined periods is detected to exceed a predetermined count value;
    wherein in response to the computing module determining that the inter-period coincidence event occurs, a distance of the target is calculated according to time information related to the inter-period coincidence event.

2. The distance measuring device according to claim 1, wherein the computing module includes:
    a delay circuit including a plurality of delay elements configured to receive the binary pulses, wherein the delay elements respectively delay the binary pulses by the predetermined period to generate a delay period number of delay signals;
    an adder circuit configured to select at least one of the delay signals for accumulating according to a period counting configuration to generate an accumulated trigger signal, wherein the period counting configuration defines a predetermined period number of a plurality of the predetermined periods, and the accumulated trigger signal records data of the binary pulse in the predetermined period number of the predetermined periods in different time intervals;
    a comparator circuit configured to receive one of the delay signals and a threshold setting signal to determine whether a number of the binary pulses is larger than a predetermined count value of the binary pulses during the predetermined period number of the predetermined periods to determine whether the inter-period coincidence event occurs, and generates a determination result signal, wherein the threshold setting signal is related to the predetermined count value; and
    a processor configured to perform a ranging algorithm to calculate the distance of the target based on the determination result signal.

3. The distance measuring device according to claim 2, further comprising:
a first clock generating circuit connected to the pulsed laser source and the calculating module, and configured to generate a first clock signal,
wherein the pulsed laser source obtains the predetermined period by using the first clock signal, and the delay circuit delays the binary pulses by the predetermined period through the first clock signal.

4. The distance measuring device according to claim 3, wherein the predetermined period includes a plurality of variable periods and the delay elements respectively delay the binary pulses by the plurality of variable periods to generate the delay period number of the delay signals.

5. The distance measuring device of claim 4, wherein the adder circuit is configured to select one of the delay signals for accumulating according to the period counting configuration to generate the accumulated trigger signal, wherein the period counting configuration defines the predetermined period number of the variable predetermined periods.

6. The distance measuring device according to claim 5, further comprising:
configuring a second clock generating circuit to generate a second clock signal having a sampling period, wherein the sampling period is related to a pulse width of the laser pulse, and a period of the second clock signal is less than a period of the first clock signal;
wherein the delay elements include a plurality of D-type flip-flops, and the D-type flip-flops receive the second clock signal, and sample the binary pulses according to the sampling period and delay the binary pulses to generate the delay signals.

7. The distance measuring device according to claim 6, wherein the delay circuit includes a plurality of delay line units, wherein four of the D-type flip-flops that are adjacent to each other are used as one of the delay line units, and clock terminals of two of the D-type flip-flops of the four D-type flip-flops that are adjacent to each other receive the second clock signal for generating a first half-delay signal, and the clock terminals of another two of the D-type flip-flops of the four D-type flip-flops that are adjacent to each other receive an inverted signal of the second clock signal for generating a second half-delay signal.

8. The distance measuring device according to claim 7, wherein the adder circuit correspondingly selects the first half delay signal and the second half delay signal according to the period counting configuration to generate the accumulated trigger signal.

9. The distance measuring device according to claim 1, wherein the computing module further includes a time-to-digital converter configured to calculate a time difference between a time at which the pulsed laser source emits the laser pulse and a time at which the photon receiving event occurs to generate a time information signal including the time information.

10. A distance measuring method, comprising:
configuring a pulsed laser source to emit a laser pulse to a target in accordance with a predetermined period;
configuring a photon counting type of light receiving element of a light receiving unit to receive incident light and output binary pulses, wherein each of the binary pulses is used to indicate whether a photon receiving event occurs; and
configuring a computing module to receive the binary pulses and determine whether an inter-period coincidence event occurs, wherein the inter-period coincidence event is determined to occur when a number of a plurality of photon receiving events on relative positions in a predetermined period number of the predetermined periods is detected to exceed a predetermined count value;
wherein if the computing module determines that the inter-period coincidence event occurs, configuring the computing module to calculate a distance of the target according to time information related to the inter-period coincidence event.

11. The distance measuring method according to claim 10, wherein the computing module includes a delay circuit, an adder circuit, a comparator circuit and a processor, and the distance measuring method further comprises:
configuring a plurality of delay elements of the delay circuit to receive the binary pulses to respectively delay the binary pulses by the predetermined period to generate a delay period number of delay signals;
configuring the adder circuit to select at least one of the delay signals for accumulating according to a period counting configuration to generate an accumulated trigger signal, wherein the period counting configuration defines a predetermined period number of plurality of the predetermined periods, and the accumulated trigger signal records data of the binary pulse in the predetermined period number of the predetermined periods in different time intervals;
configuring the comparator circuit to receive one of the delay signals and a threshold setting signal to determine whether a number of the binary pulses is larger than a predetermined count value of the binary pulses during the predetermined period number of the predetermined periods to determine whether the inter-period coincidence event occurs, and generate a determination result signal, wherein the threshold setting signal is related to the predetermined count value; and
configuring the processor to perform a ranging algorithm to calculate the distance of the target based on the determination result signal and the time information.

12. The distance measuring method according to claim 11, further comprising:
configuring a first clock generating circuit connected to the pulsed laser source and the calculating module to generate a first clock signal, wherein the pulsed laser source obtains the predetermined period by using the first clock signal, and the delay circuit delays the binary pulses by the predetermined period by the first clock signal.

13. The distance measuring method according to claim 12, wherein the predetermined period includes a plurality of variable periods and the delay elements respectively delay the binary pulses by the plurality of variable periods to generate the delay period number of the delay signals.

14. The distance measuring method of claim 13, wherein the adder circuit is configured to select one of the delay signals for accumulating according to the period counting configuration to generate the accumulated trigger signal, wherein the period counting configuration defines the predetermined period number of the variable predetermined periods.

15. The distance measuring method according to claim 14, further comprising:
configuring a second clock generating circuit to generate a second clock signal having a sampling period, wherein the sampling period is related to a pulse width of the laser pulse, and a period of the second clock signal is less than a period of the first clock signal;

wherein the delay elements include a plurality of D-type flip-flops, and the D-type flip-flops receive the second clock signal, and sample the binary pulses according to the sampling period and delay the binary pulses to generate the delay signals.

16. The distance measuring method according to claim 15, wherein the delay circuit includes a plurality of delay line units, wherein four of the D-type flip-flops that are adjacent to each other are used as one of the delay line units, and clock terminals of the two D-type flip-flops of the four D-type flip-flops that are adjacent to each other receive the second clock signal for generating a first half-delay signal, and the clock terminals of another two of the D-type flip-flops of the four D-type flip-flops that are adjacent to each other receive an inverted signal of the second clock signal for generating a second half-delay signal.

17. The distance measuring method according to claim 16, wherein the adder circuit correspondingly selects the first half delay signal and the second half delay signal according to the period counting configuration to generate the accumulated trigger signal.

18. The distance measuring method according to claim 10, further comprising configuring a time-to-digital converter of the computing module to calculate a time difference between a time at which the pulsed laser source emits the laser pulse and a time at which the photon receiving event occurs to generate a time information signal including the time information.

* * * * *